March 31, 1925.                                                           1,531,664
C. N. F. KNAPE
RESILIENT DRIVING CONNECTION FOR ELECTRIC RAILWAY VEHICLES
Filed April 12, 1921
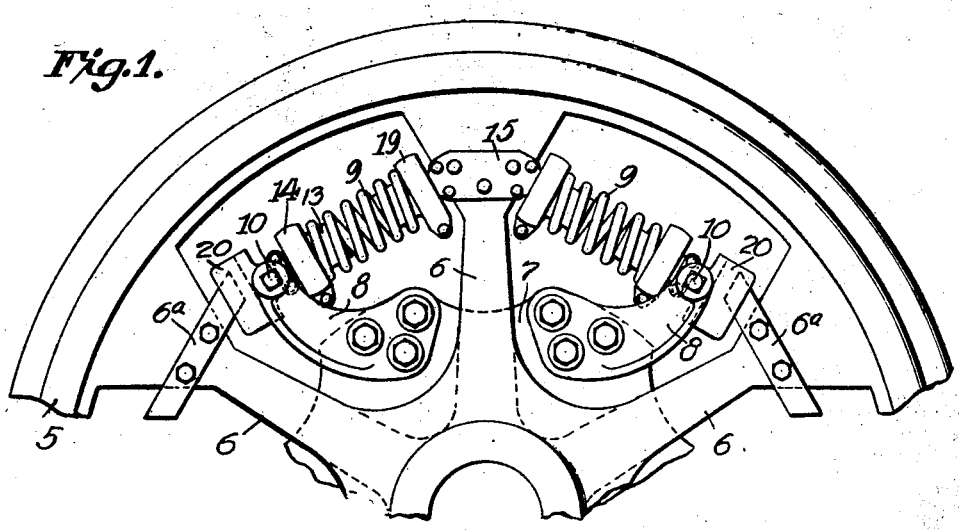
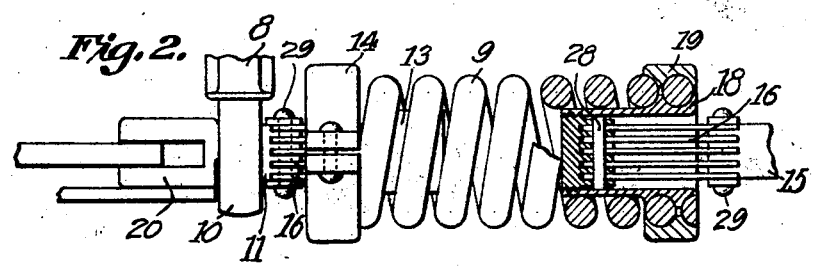
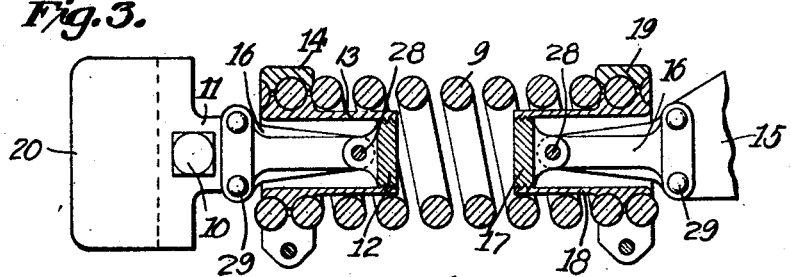
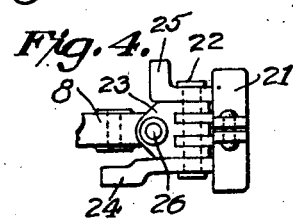
WITNESSES:
R. S. Harrison
A. Martin
INVENTOR
Charles N. F. Knape,
BY
Wesley Gear
ATTORNEY Patented Mar. 31, 1925.

1,531,664

UNITED STATES PATENT OFFICE.

CHARLES N. F. KNAPÉ, OF WILKINSBURG, PENNSYLVANIA, ASSIGNOR TO WESTING-HOUSE ELECTRIC & MANUFACTURING COMPANY, A CORPORATION OF PENNSYLVANIA.

RESILIENT DRIVING CONNECTION FOR ELECTRIC RAILWAY VEHICLES.

Application filed April 12, 1921. Serial No. 460,842.

*To all whom it may concern:*

Be it known that I, CHARLES N. F. KNAPÉ, a citizen of the United States, and a resident of Wilkinsburg, in the county of Allegheny and State of Pennsylvania, have invented a new and useful Improvement in Resilient Driving Connections for Electric Railway Vehicles, of which the following is a specification.

My invention relates to resilient driving connections such as are employed, for example, between the propelling motors and the driving wheels of railway vehicles, and more particularly to driving mechanism of a type similar to that disclosed in Patent #1,089,168, issued on March 3, 1914, to the Westinghouse Electric & Mfg. Company as assignee, wherein tangentially disposed coil springs are interposed between the driving and the driven members.

The object of my invention is to provide means for neutralizing the tendency toward distortion of the spring elements caused by centrifugal forces incident to the operation of the vehicle, and more particularly to means for properly counterbalancing such forces.

In driving connections of this character, wherein a yielding element of comparatively great length is required, the centrifugal forces incident to the operation of the drive tend to distort the resilient elements and to impose unnecessary strains thereupon. To overcome this condition, I provide means for pivotally supporting the ends of each spring in such manner that the weight between the points of pivotal support are counterbalanced by the weights exteriorly thereof. This I accomplish by forming the supporting member so that it will extend to a point within the spring, or by adding a counterbalancing weight to the supporting member in cases where it is not desired to extend it to a point intermediate the ends of the spring.

As shown in the accompanying drawing:

Fig. 1 is a side elevational view of a portion of a locomotive wheel embodying my invention.

Fig. 2 is a view, partially in top plan and partially in section, of the resilient element shown in Fig. 1.

Fig. 3 is a longitudinal sectional view of the device of Fig. 2, and

Fig. 4 is a plan view of a modified form of device.

My invention is shown as applied to locomotive driving wheel 5, provided with spokes 6, that is driven by means of a motor (not shown) through a quill 7 that is provided with arms 8, the outer ends of which are so positioned as to be in substantially circumferential alignment with the spokes 6.

Helical springs 9 are interposed between the quill arms 8, and alternate spokes 6, to serve as resilient driving elements in the usual manner. The quill arms 8 are provided with axially disposed pivot pins or extensions 10 to serve as supporting members for brackets 11 that are pivotally connected at their inner ends to seating block member 12 in the manner shown more clearly in Fig. 3.

Seating blocks 13 have screw engagement with the members 12 and the end turns of the springs are secured in grooves on the outer face of the seating blocks 13 by means of clamping rings 14.

At their other ends, the springs are supported by brackets 15 that are bolted to the spokes 6, by means of a series of plates 16 that are pivotally connected to seating block members 17. Seating blocks 18 and clamping rings 19, identical in construction with members 13 and 14 at the other end of the spring, are also provided.

It will be noted that the respective ends of the springs are pivotally supported at points intermediate their ends, and that those portions of the springs and their seats which project outwardly from such pivot points, act as counterbalances for the main body of the spring, in order to neutralize the effects of centrifugal forces created by reason of the rotation of the driving wheel.

It will be further observed that the bracket 11 is provided with an extension 20. This extension has a rectangular opening whereby it is slidably, but non-rotatably supported upon the pin 10, and is slotted for movement radially with respect to a plate 6ª that is secured to a spoke 6 of the wheel, thereby permitting relative radial movement, as between the quill arm and the driving wheel proper, without causing abnormal stresses to be imposed upon the springs. The plate 6ª, besides acting as a guide member for the block 20 and the quill arm 8, also serves as a stop member therefor, when power is applied in such direction that a quill arm is biased towards its associated plate 6ª.

In the form of device shown in Fig. 4, the spring element is secured to the seating block 21 that is pivotally supported by a pin 22 extending through a hinge member 23 that is, in turn, pivoted to a quill arm 8 at 26. This provides a double pivoting arrangement whereby the spring seat is enabled to maintain itself in alignment with the spring when such spring is subjected to radial or axial displacement with respect to its normal position, but this feature does not come within the scope of the present invention. In the construction just described, the seating block is provided with weighted extensions 24 and 25 which serve to counterbalance the centrifugal forces imposed upon the main portion of the spring.

It will be noted that, in this arrangement, the seating block 21 is pivoted exteriorly of the end turns of the spring instead of within the spring.

The provision of the interleaving relation of the plates 16 to the brackets 15 and the seating block members 17, and to the brackets 11 and seating block members 12, permits the employment of pins 28 and 29 of smaller diameter than if a single block were employed in lieu of the plates. This, for the reason that shearing strains on the pins are distributed to a number of points on the pins.

It will be apparent that either one or both ends of the spring elements may be supported in the manner shown in either Figs. 3 or 4, or that one end may be supported by one form of device and the other end thereof supported by the other form of construction.

Various other modifications might be made in the form and general arrangement of the device without departing from the spirit of the invention as set forth in the accompanying claims.

I claim as my invention:

1. The combination with a rotatable driven member and a driving member therefor, of a resilient connection interposed therebetween comprising a yielding member secured adjacent to each of its ends to members that are pivotally connected to the said driving and driven members, the pivotal connections being disposed at points intermediate the ends of the resilient members.

2. The combination with a rotatable driven member and a driving member therefor, of a resilient element interposed therebetween, said resilient element being pivotally secured adjacent to each of its ends to members that are respectively connected to the driving and to the driven members, and means on said supporting members for counterbalancing that portion of the resilient element lying between the said pivotal points of connection.

3. A resilient connection comprising a helical spring, a seating block in each end of the spring, said seating block being provided with an extension lying within the spring, and a pivotal supporting member secured to said extension.

4. A resilient connection comprising a helical spring, a seating block for supporting each end thereof, said seating block being of sleeve-like construction and disposed within the spring, and a supporting member for the seating block extending into the same and pivotally connected thereto.

5. The combination with rotatable driving and driven members, of elongated resilient elements interposed therebetween, and means associated with the ends of said resilient elements to neutralize the effect of the centrifugal force exerted on said resilient elements.

In testimony whereof, I have hereunto subscribed my name this 31st day of March, 1921.

CHARLES N. F. KNAPÉ.